United States Patent [19]

Kikuchi

[11] Patent Number: 5,052,791
[45] Date of Patent: Oct. 1, 1991

[54] VARIABLE MAGNIFICATION VIEWFINDER OPTICAL SYSTEM WITH VARIABLE MAGNIFICATION BASED ON POLARIZATION

[75] Inventor: Juro Kikuchi, Kitatsuru, Japan

[73] Assignee: Olympus Optical Co., Ltd., Tokyo, Japan

[21] Appl. No.: 550,136

[22] Filed: Jul. 9, 1990

[30] Foreign Application Priority Data

Jul. 10, 1989 [JP] Japan .................................. 1-177361

[51] Int. Cl.$^5$ ...................... G02B 23/14; G02B 15/00; G02B 1/02; G02F 1/13
[52] U.S. Cl. ...................................... 359/421; 359/93; 359/94; 359/319; 359/494; 359/497; 359/642; 359/666
[58] Field of Search ............... 350/559, 560, 570, 411, 350/423, 347 V, 352, 379, 384, 400, 418, 403, 374, 391, 388

[56] References Cited

U.S. PATENT DOCUMENTS 4,758,070 7/1988 Nishimoto ........................... 350/379

FOREIGN PATENT DOCUMENTS

| 224820 | 12/1984 | Japan | ................................... 350/379 |
| 60-166934 | 8/1985 | Japan . | |
| 61-77820 | 4/1986 | Japan . | |
| 61-87122 | 5/1986 | Japan . | |
| 110117 | 5/1986 | Japan | ........................... 350/347 V |
| 160714 | 7/1986 | Japan | ................................... 350/352 |
| 61-221720 | 10/1986 | Japan . | |
| 62-56918 | 3/1987 | Japan . | |
| 63-129312 | 6/1988 | Japan . | |
| 2011640 | 7/1979 | United Kingdom | ........... 350/347 V |

Primary Examiner—Jon W. Henry
Attorney, Agent, or Firm—Cushman, Darby & Cushman

[57] ABSTRACT

The variable magnification viewfinder optical system comprises a polarizing element allowing the light incident thereon to emerge as a linearly polarized light, an objective optical system comprising a first lens component having refractive power variable dependently on the oscillating direction of the incident light, an eyepiece optical system comprising a second lens component having variable refractive power and a switching device capable of changing the oscillating direction of said polarizing element from one to another perpendicular to each other. This viewfinder optical system is capable of easily attaining to design performance thereof such as magnification, dioptric power, field ratio and image legibility, and permits simplifying composition thereof and lowering manufacturing cost therefor.

9 Claims, 3 Drawing Sheets

VARIABLE MAGNIFICATION VIEWFINDER OPTICAL SYSTEM WITH VARIABLE MAGNIFICATION BASED ON POLARIZATION

BACKGROUND OF THE INVENTION a) Field of the Invention

The present invention relates to a variable magnification viewfinder optical system to be used in cameras, etc., and more specifically to a variable magnification viewfinder optical system suited for use in 35 mm lens shutter cameras.

b) Description of the Prior Art

In the recent years, there have been proposed numerous 35 mm lens shutter cameras which are adapted to be used at two selectable focal lengths. For such cameras having two selectable focal lengths, it is convenient for confirming actual photographing field angles on finders to compose finders so as to permit varying magnifications thereof in conjunction with the selection of focal lengths of the photographic lens systems. For providing this convenience, there have already been proposed a variety of finder optical systems which permit varying magnifications thereof. For example, Japanese Preliminary Patent Publication No. Sho 60-166934 proposed an inverted Galileo finder comprising a negative objective lens component and a positive eyepiece lens component arranged in the order from the object side, and adapted to permit varying magnification of the finder by replacing said negative objective lens component with another objective lens component which is composed of a positive lens element and a negative lens element arranged in the order from the object side.

Further, Japanese Preliminary Patent Publication No. Sho 61-87122 proposed a finder optical system comprising, in the order from the object side, a fixed lens component having a positive refractive power as a whole, a negative movable lens component and a fixed lens component having a positive refractive power as a whole, and adapted to vary focal length of the finder by moving said negative movable lens component forward and backward along the optical axis.

Furthermore, Japanese Preliminary Patent Publication No. Sho 63-129312 proposed an inverted Galileo finder which comprises, in the order from the object side, a negative objective lens component composed of two negative lens elements and a positive fixed eyepiece lens component, and is adapted a to vary magnification thereof by placing one of the two negative lens elements out of the effective optical path of the finder and moving the other negative lens element toward the eyepiece lens component along the optical axis.

Japanese Preliminary Patent Publication No. Sho 61-77820 proposed a finder optical system which comprises an objective lens component designed as a negative lens component consisting of a lens element having a positive refractive power and a lens element having a negative refractive power including at least one lens element made of a transparent elastic material, and an eyepiece lens component designed as a positive lens component, and is adapted to vary magnification thereof by deforming the transparent elastic material lens element so as to vary the refractive power of the objective lens component as a whole.

Japanese Preliminary Patent Publication No. Sho 61-221720 proposed a finder optical system which comprises an objective lens component and an eyepiece lens component each composed of a single lens element made of a transparent elastic material, and is adapted to vary magnification thereof by deforming the lens elements so as to vary the refractive powers thereof while maintaining a certain definite relationship therebetween.

Japanese Preliminary Patent Publication No. Sho 62-56918 proposed a finder optical system which comprises lens elements including ones designed as liquid crystal lens elements and is adapted to vary magnification thereof by moving some of the lens elements other than the liquid crystal lens elements in accordance with variation of the refractive powers of the liquid crystal lens elements.

Out of the conventional examples described above, however, each of the finder optical systems which is adapted to vary the magnification thereof by moving a portion of the optical system has a composition to move one or more lens elements to vary the refractive power of the objective lens component as a whole, and therefore has disadvantages such as the mechanism for varying the magnification is complicated and requires high precision, and cost is increased for manufacturing the finder optical system in practice since the number of parts is increased, thus requiring tedious assembly procedures and delicate adjustment. Speaking concretely, it is necessary to compose the magnification varying mechanism in such a manner that the movable lens elements are located with correct distances reserved to the other fixed lens elements before and after the movements and with no eccentricities with regard to the optical axis. Otherwise, it will be difficult to attain to the design performance such as the magnification, dioptric power, field ratio, and image legibility. Further, the finder optical systems which are adapted to vary magnifications thereof by using the lens elements having the variable refractive powers, out of the conventional examples described above, control the refractive powers by deforming the external shapes of the lens elements having the variable refractive powers under physical forces of driving devices and must control the driving devices with high accuracy so as to obtain stable deformation degrees, thereby having disadvantages that the driving mechanisms and the control circuits. therefor are complicated and that costs are enhanced for manufacturing the finder optical systems in practice.

SUMMARY OF THE INVENTION

A primary object of the present invention is to provide a variable magnification viewfinder optical system which has a simplified mechanism for varying magnification thereof and can be manufactured at a reduced cost.

Another object of the present invention is to provide a variable magnification viewfinder optical system which is easily capable of attaining to design performance such as magnification, field ratio and image legibility with high precision.

The variable magnification viewfinder optical system according to the present invention comprises a polarizing element for allowing incident light to emerge as linearly polarized light, an objective optical system comprising a first lens component having refractive power that varies depending on the oscillating direction of the incident light, and an eyepiece optical system comprising a second lens component having variable refractive power, and is adapted to change the oscillating direction of said polarizing element from one plane to another plane perpendicular to the first.

Since the variable magnification viewfinder optical system according to the present invention comprises no movable lens elements, it permits positioning the lens elements thereof with high precision, thereby attaining a precise design performance with a simple mechanism, reducing the number of the required parts as well as the number of assembling and adjusting steps, and lowering manufacturing cost. Speaking more concretely, the present invention makes it possible to easily attain to a predetermined design performance of the viewfinder optical system in respect of magnification, dioptric power, field ratio, and image legibility since the element varied for changing magnification of the optical system has no relation to the relative distance between the lens components of the optical system or eccentricity with regard to the optical axis thereof. Further, since magnification of the viewfinder optical system according to the present invention is changed by turning the polarizing element by an angle of 90° or ON-OFF control of an application voltage to a liquid crystal layer, an alternative control is sufficient for the magnification change, thereby making it possible to simplify the driving mechanism and the control circuit, and to lower manufacturing cost for the viewfinder optical system.

These and other objects as well as the features and the advantages of the present invention will becomes apparent from the following detailed description of the preferred embodiments when taken in conjunction with the accompanying drawings.

DESCRIPTION OF THE PREFERRED EMBODIMENTS

Prior to detailed description of the present invention with reference to the preferred embodiments, the lens elements having variable refractive powers, the control method for changing polarizing direction of light by 90° and fundamental composition of the viewfinder optical system according to the present invention will be explained below.

The lens elements having variable refractive powers (birefringent lens components) can be made of crystalline materials such as liquid crystal and calcite.

Figure 1A:
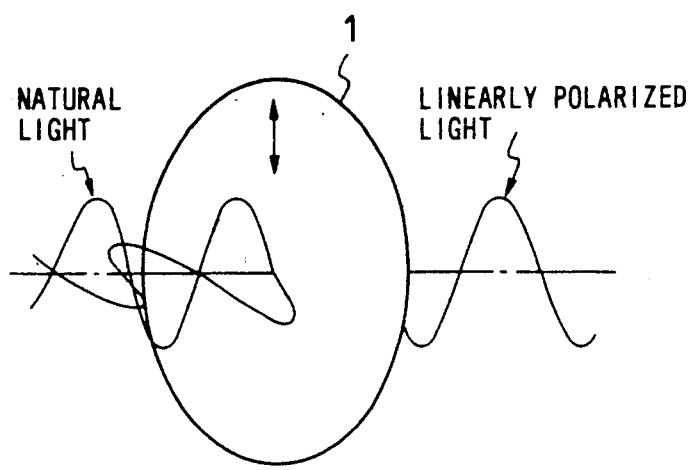
FIG. 1A and FIG. 1B are diagrams illustrating the principal to change polarizing direction of light by turning a polarizing plate around an optical axis.
Figure 1B:
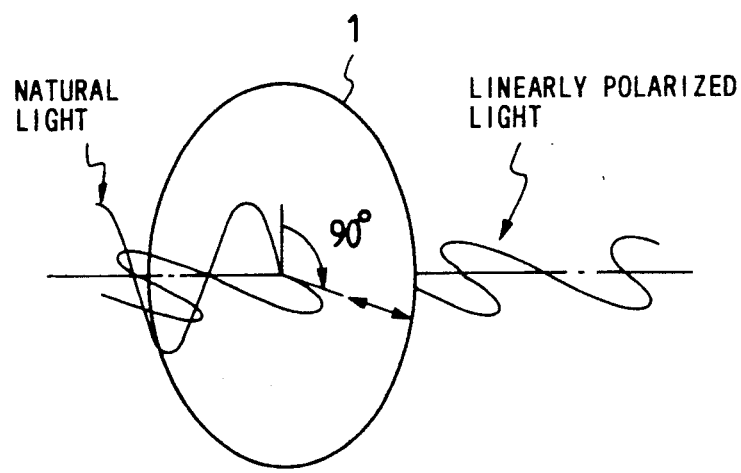
Figure 2A:
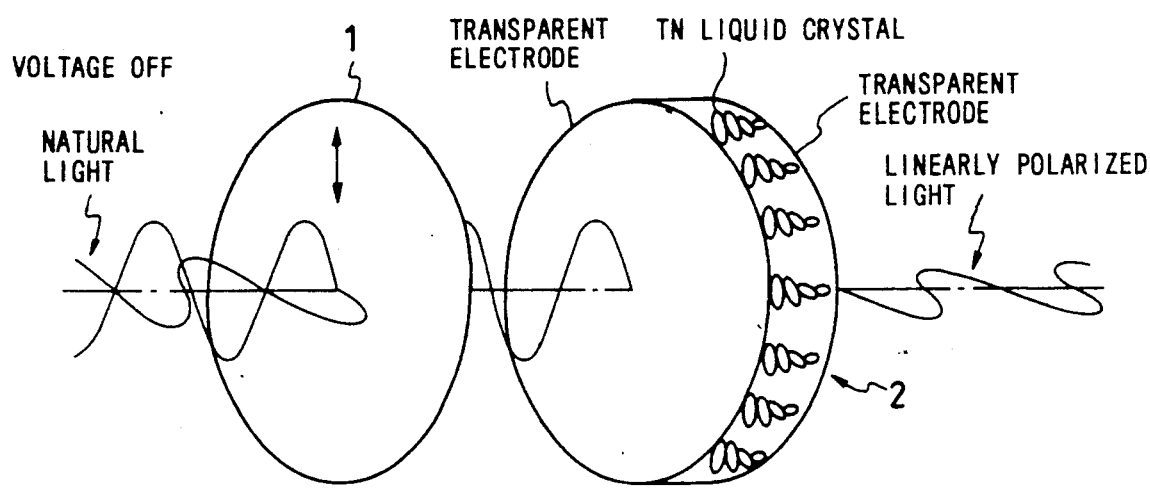
FIG. 2A and FIG. 2B are diagrams illustrating the principle to change polarizing direction of light by eletrically driving a TN liquid crystal layer arranged after the polarizing plate.
Figure 2B:
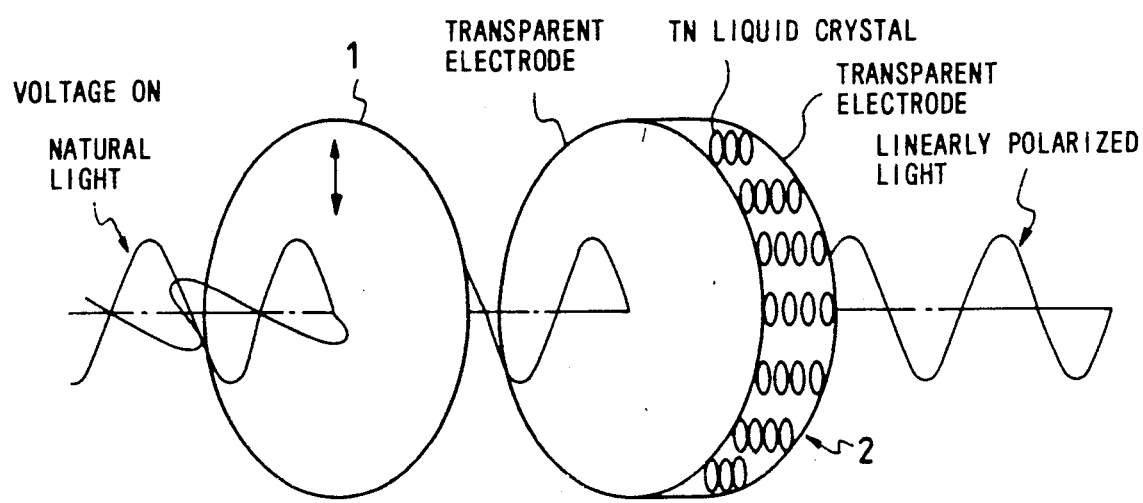

Further, the variable magnification viewfinder optical system is to be controlled so as to change polarizing direction of light by 90° by a certain adequate method, for example, one of the two methods described below. One method is to turn a polarizing plate 1 around an optical axis as illustrated in FIG. 1A and FIG. 1B. The other method is to arrange a TN (twist nematic) liquid crystal layer 2 after the polarizing plate 1 as illustrated in FIG. 2A and FIG. 2B, and turn the polarizing direction by electrically driving the TN liquid crystal layer 2.

Since the viewfinder optical system has a fundamental composition wherein the optical system can be divided into the objective lens component and the eyepiece lens component, the following formula must nearly establish among refractive power $\phi_O$ of the objective lens component, refractive power $\phi_E$ of the eyepiece lens component and paraxial distance e between these lens components:

$$1/\phi_O + 1/\phi_E = e$$

Hence, when the refractive power $\phi_O$ of the objective lens component, the refractive power $\phi_E$ of the eyepiece lens component and angular magnifications $\gamma$ at the tele position and the wide position respectively are represented by reference symbols $\phi_{OT}$, $\phi_{ET}$, $\gamma_T$ and $\phi_{OW}$, $\phi_{EW}$, $\gamma_W$ respectively, the following formulas will establish;

$$1/\phi_{OW} + 1/\phi_{EW} = 1/\phi_{OT} + 1/\phi_{ET} = e$$

$$\gamma_W = -\phi_{EW}/\phi_{OW}, \gamma_T = -\phi_{ET}/\phi_{OT}$$

When an image point is located between the rear principal point of the objective lens component and the front principal point of the eyepiece lens component (when $\phi_O$ and $\phi_E$ have the same sign), it is therefore necessary to select a composition of the optical system wherein $\phi_O$ is strong (has a large absolute value) and $\phi_E$ is weak for the wide position, and another composition wherein $\phi_O$ is weak and $\phi_E$ is strong for the tele position. When an image point is located before the rear principal point of the objective lens component (in case of $\gamma < 1$) (when $\phi_O$ and $\phi_E$ have the signs different from one another), it is necessary to select a composition wherein both $\phi_O$ and $\phi_E$ are strong for the wide position, and another composition wherein both $\phi_O$ and $\phi_E$ are weak for the tele position. In a case where an image point is located after the front principal point of the eyepiece lens component (in case of $\gamma > 1$)(when $\phi_O$ and $\phi_E$ have the signs different from each other), it is necessary to select a composition wherein both $\phi_O$ and $\phi_E$ are weak for the wide position and another composition wherein both $\phi_O$ and $\phi_E$ are strong for the tele position. It will therefore be understood that the combination of $\phi_O$ and $\phi_E$ having the same sign allows to obtain a magnification variation ratio $\gamma_T/\gamma_W$ which is higher than that available with the combinations of $\phi_O$ and $\phi_E$ having the signs different from each other when the selected refractive power $\phi_O$ or $\phi_Z$ varies at the same rate.

In the description of the above formula, the expression "must nearly establish" is selected since strict establishment of the above formula will be at zero diopter, which is set slightly on the negative side in most cases of practical designs. Even when diopter is not set at zero, e has a value different only slightly from that determined by formula.

Further, each of the refractive power $\phi_O$ of the objective lens component and the refractive power $\phi_E$ of the eyepiece lens component is divided, by the paraxial theory, into a portion which varies depending on polarizing direction and another portion which is constant independent of the polarizing direction. When the variable portions of the refractive powers of the objective lens component and the eyepiece lens component are represented by $\phi_{OV}$ and $\phi_{EV}$ respectively, and the invariable portions of the refractive powers of the objective lens component and the eyepiece lens component are designated by $\phi_{OC}$ and $\phi_{EC}$ respectively, $\phi_O$ and $\phi_E$ can be expressed as follows:

$$\phi_O = \phi_{OC} + \phi_{OV},$$

$$\phi_E = \phi_{EC} + \phi_{EV}$$

Now, assuming that $\phi_{OC} = \phi_{EC} = 0$, the angular magnification at the tele position and that at the wide position of the optical system are in the following relationship:

$$\gamma_W \cdot \gamma_T = 1$$

However, $\phi_{OC} = \phi_{OE} = 0$ is inconvenient since viewfinder optical system should generally be so designed as to have magnification levels lower than 1x at both the tele position and the wide position taking the visual performance of photographers into consideration. By selecting adequate values other than 0 for $\phi_{OC}$ and $\phi_{OE}$, it is possible to obtain $\gamma_W \cdot \gamma_T \neq 1$, or optionally set $\gamma_W$ and $\gamma_T$ matched with the visual performance of photographers. For this purpose, it is practically important to impart refractive powers ($\phi_{OC} \neq 0$, $\phi_{OE} \neq 0$) to the lens elements other than the birefringent lens elements for obtaining $\gamma_W \cdot \gamma_T \neq 1$ independently of the refractive index of the liquid crystal.

As for indications for the range finding frame and visual field frame, two types are conceivable. In one of these types, apparent sizes of these indications are kept constant regardless of magnification change by composing the optical system in such a manner that the polarized direction of the rays to be used for the indications is always kept constant independently of the polarized direction of the rays used in the visual field system. In the other type, the optical system is composed taking into consideration the variation of apparent sizes of the indications to be caused by the magnification change.

Now, the present invention will be described more detailedly with reference to the preferred embodiments illustrated in the accompanying drawings.

In the following description on the magnification change in the embodiments, thickness of each lens component is ignored since refractive power is almost never influenced by the thickness.

Embodiment 1

Figure 3:
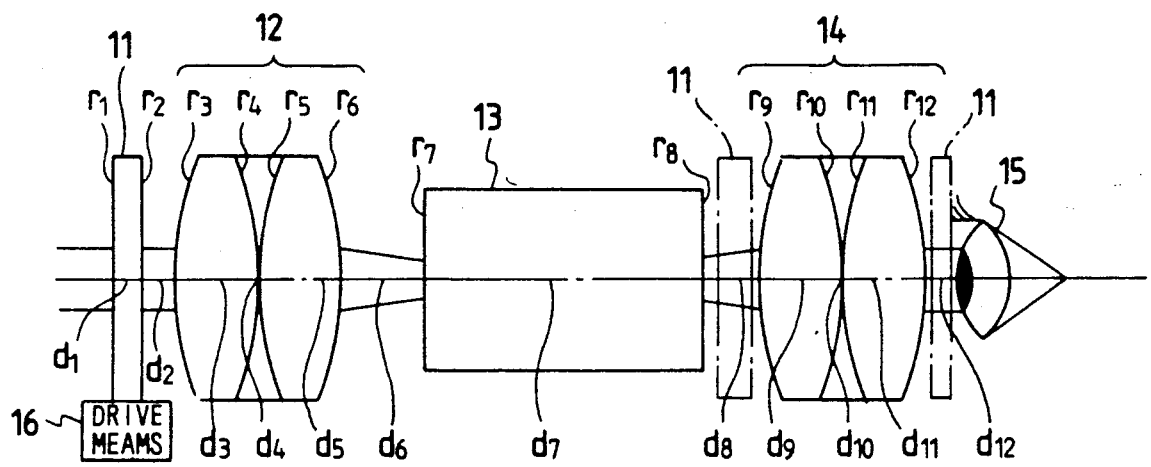
FIG. 3 is a sectional view illustrating the composition of an Embodiment 1 of the variable magnification viewfinder optical system according to the present invention.

FIG. 3 shows a keplerian variable magnification viewfinder optical system preferred as the Embodiment 1, wherein a polarizing plate 11, an objective lens component 12, an erect prism 13 and eyepiece lens component 14 are arranged in the order from the object side, and an eye 15 is located at the position of the exit pupil of the eyepiece lens component 14. The polarizing plate 11 is mounted on a polarizing plate driving device 16 so as to be rotatable 90° around the optical axis. Further, both the objective lens component 12 and the eyepiece lens component 14 are designed as cemented doublets each of which is used as a case and consists of lens elements made of a material having low double refraction and having a liquid crystal lens layer interposed therebetween. Though the surfaces located before and after the liquid crystal layers are traced as spherical surfaces for representing the refractive powers of the surfaces in FIG. 3, these surfaces are designed actually as Fresnel lens surfaces. Radii of curvature on the surfaces of the lens elements arranged in the objective lens component 12 are $r_3$, $r_4$, $r_5$ and $r_6$ in the order from the object side, whereas radii of curvature on the surfaces of the lens elements arranged in the eyepiece lens component 14 are $r_9$, $r_{10}$, $r_{11}$ and $r_{12}$ in the order from the object side. Each of the cases of the liquid crystal lens elements has a refractive index $n_C$ ($=1.51633$), and the liquid crystal has a refractive index n. ($=1.7$) for the extraordinary ray and refractive index n. ($=1.5$) for the ordinary ray. The liquid crystal lens elements arranged in the objective lens component 12 and the eyepiece lens component 14 are oriented so as to be perpendicular to each other, and the polarizing plate 11 is set in such a direction that the ray having been transmitted through the polarizing plate 11 is always polarized as the ordinary ray at a wide position and as the extraordinary ray at the tele position for the liquid crystal lens element arranged in the objective lens component. The reason for selecting the perpendicular orientation between the liquid crystal lens elements will be described later together with the refractive power distribution in the Embodiment 1.

Since the liquid crystal used in the Embodiment 1 has an Abbe's number of approximately 30 which is smaller than that of the plastic material selected for the cases, the cases are used as positive lens elements and the liquid crystal lens elements are used as negative lens elements. Furthermore, since $\phi_O$ and $\phi_E$ have the same sign, the optical system is composed in such a manner that the objective lens component 12 has strong power and the eyepiece lens component 14 has weak power at the wide position, and vice versa at the tele position. Speaking more concretely, the optical system is composed in such a manner that the negative power of the liquid crystal lens element of the objective lens component 12 is weakened and the negative power of the liquid crystal lens element of the eyepiece lens component 14 is strengthened at the wide position, and vice versa at the tele position, whereby the liquid crystal lens element of the objective lens component 12 has a low refractive index and the liquid crystal lens element of the eyepiece lens component 14 has a high refractive index at the wide position, and vice versa at the tele position. In addition, though each of the lens components has a slightly positive refractive power when the liquid crystal is set at the lower refractive index thereof which has an absolute value smaller than that of the refractive power of the case in the Embodiment 1, the fundamental concept described above is applicable to the Embodiment 1.

Now, description will be made on the variation of megnification.

First, a ray coming from an object passes through the polarizing plate 11, the objective lens component 12, the erect prism 13 and the eyepiece lens component 14 in this order, and then is incident on the eye 15.

At the wide position, the ray having been transmitted through the polarizing plate 11 is polarized in such a direction as to be the ordinary ray for the liquid crystal lens element in the objective lens component 12 and the extraordinary ray for the liquid crystal lens element in the eyepiece lens component 14. Accordingly, the power of the objective lens component 12, that of the eyepiece lens component 14 and the angular magnification of the optical system at the wide position are calculated by the following formulae:

$$\phi_{OW}=(n_C-1)(1/r_3-1/r_6)+(n_O-1)(1/r_4-1/r_5)$$

$$\phi_{EW}=(n_C-1)(1/r_9-1/r_{12})+(n_e-1)(1/r_{10}-1/r_{11})$$

$$\gamma_W=-\phi_{EW}/\phi_{OW}$$

The refractive powers and angular magnification calculated by using the above formulae are $\phi_{OW}=0.03982$, $\phi_{EW}=0.01877$ and $\gamma_W=-0.4712$. On the other hand, accurate calculations taking thickness into consideration will give refractive powers of $\phi_{OW}=0.03927$ and $\phi_{EW}=0.0186$ as well as an angular magnification $\gamma_W=-0.47517$ at a dioptric power of $-1$ diopter.

At the tele position where the polarizing plate 11 is rotated 90° around the optical axis from the direction thereof at the wide position by a polarizing plate drive means 16, the ray having passed through the polarizing plate 11 is polarized so as to be the extraordinary ray for the liquid crystal lens element arranged in the objective lens component 12 and the ordinary ray for the liquid crystal lens element in the eyepiece lens component 14. Therefore, the refractive power of the objective lens component 12, that of the eyepiece lens component 14, and the angular magnification of the optical system are as calculated by the following formulae:

$$\phi_{OT}=(n_C-1)(1/r_3-1/r_6)+(n_C-1)(1/r_4-1/r_5)$$

$$\phi_{ET}=(n_C-1)(1/r_9-1/r_{12})+(n_O-1)(1/r_{10}-1/r_{11})$$

$$\gamma_T=-\phi_{ET}/\phi_{OT}$$

The refractive powers and angular magnification calculated by using the above formulae are $\phi_{OT}=0.02638$, $\phi_{ET}=0.02543$ and $\gamma_T=-0.9640$ respectively. On the other hand, accurate calculations taking thickness into consideration will give powers of $\phi_{OT}=0.02619$ and $\phi_{ET}=0.02521$ as well as an angular magnification $\gamma_T=-0.97530$ at a dioptric power of $-1$ diopter. In the Embodiment 1, the surfaces of the liquid crystal lens elements are designed as Fresnel type for thinning the liquid crystal layers. Further, the polarizing plate 11 may be of various types.

It is generally necessary for liquid crystal lens elements to select thin liquid crystal layers in order to stabilize orientations of liquid crystal molecules. In case of a liquid crystal lens element having a large effective diameter, a method to design at least the front or rear surface of the liquid crystal layer as a Fresnel lens surface for thinning the layer. When a liquid crystal lens element has a small effective diameter, in contrast, either of the surfaces thereof need not be designed as a Fresnel surface but can be designed as a spherical surface. In the latter case, the spherical surface can be manufactured more easily and provides more legible images in the visual field.

Numerical data of the Embodiment 1 will be listed in the table shown below:

| Surface No. | Radius of curvature (r) | Distance between surfaces (d) | Refractive index or material (n) |
|---|---|---|---|
| 1 | ∞ | 1 | Polarizing plate |
| 2 | ∞ | 1 | Air |
| 3 | 26.6662 | 1 | 1.51633 |
| 4 | −29.7573 | 0.001 | Liquid crystal layer |
| | | | [$n_e = 1.7$] |
| | | | [$n_o = 1.5$] |
| 5 | 29.7573 | 1 | 1.51633 |
| 6 | −26.6662 | 12.77 | Air |
| 7 | ∞ | 75 | 1.51633 |
| 8 | ∞ | 12.77 | Air |
| 9 | 39.8927 | 1 | 1.51633 |
| 10 | −60.0280 | 0.01 | Liquid crystal layer |
| | | | [$n_o = 1.5$] |
| | | | [$n_e = 1.7$] |
| 11 | 60.0280 | 1 | 1.51633 |
| 12 | −43.2329 | 15 | Air |
| 13 | ∞ (Pupil location) | | |

Angular magnification: $\gamma_T = -0.97530$, $\gamma_W = -0.47517$
Dioptric power: $-1$ diopter Embodiment 2

Figure 4:
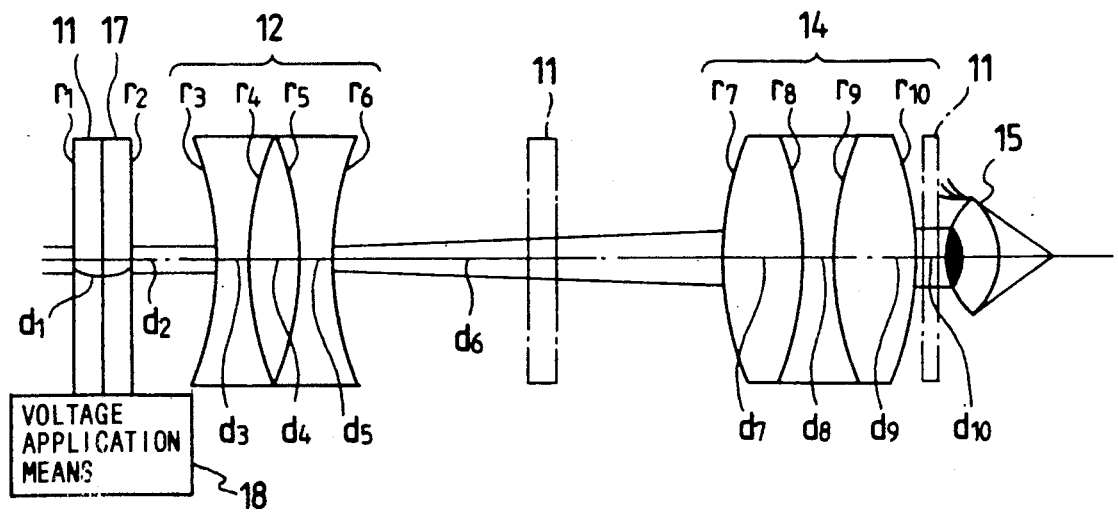
FIG. 4 is a sectional view illustrating the composition of an Embodiment 2 of the variable magnification viewfinder optical system according to the present invention.

FIG. 4 illustrates an inverted Galilean variable magnification viewfinder optical system preferred as the Embodiment 2, wherein a polarizing plate 11, a TN liquid crystal layer 17, an objective lens component 12 and an eyepiece lens component 14 are arranged in the order from the object side, and an eye 15 is located at the position of the exit pupil of the eyepiece lens component 14. The polarizing plate 11 is fixed, whereas the TN liquid crystal layer 17 is to be controlled by ON-OFF operation of a voltage application means 18. Speaking more concretely, the TN liquid crystal layer 17 is set so as to transmit the linearly polarized light coming from the polarizing plate 11 while turning the plane of polarization thereof by 90° when the voltage application means 18 is turned OFF, and transmit said light without turning the plane of polarization thereof when the voltage application means 18 is turned ON. Further, both the objective lens component 12 and the eyepiece lens component 14 are designed as cemented doublets each of which is used as a case and composed of lens elements made of a material having low double refraction and cemented with a calcite lens element interposed therebetween. In the Embodiment 2, radii of curvature on the surfaces of the lens elements composing the objective lens component are $r_3$, $r_4$, $r_5$ and $r_6$ in the order from the object side, radii of curvature on the surfaces of the lens elements composing the eyepiece lens components are $r_7$, $r_8$, $r_9$ and $n_O$ in the order from the object side, refractive index of the lens elements arranged before and after the calcite lens element is $n_C$ ($=1.51633$), refractive index of the calcite lens element for the extraordinary ray is $n_O$ ($=1.48640$), and refractive index of the calcite lens element for the ordinary ray is $n_O$ ($=1.65835$). In this case, the optical axis of the crystal of the calcite in the objective lens component 12 is parallel with that of the calcite in the eyepiece lens component 14, and the polarizing plate 11 is set in such a direction that the ray having passed through the polarizing plate 11 is polarized so as to be the extraordinary ray for the calcite lens element arranged in the objective lens component 12 at the wide position and the ordinary ray for the calcite lens element at the tele position. The reason for setting the optical axes of the crystals so as to be parallel with each other will be described later together with the fundamental concept of the power distribution selected for the Embodiment 2. As is seen from FIG. 4, in the object lens component 12 the lens elements arranged before and after calcite lens element are designed as negative lens elements and the calcite lens element is designed as a positive lens element whereas, in the eyepiece lens component 14, the lens elements arranged before and after the calcite lens element are designed as positive lens elements and the calcite lens element is designed as a negative lens element. Since calcite has an Abbe's number which is nearly equal to that of the glass material selected for the lens elements arranged before and after the calcite lens elements, the above-described lens designs have been selected not for correction of chromatic aberrations but for protecting calcite which is an easily damaged material. Further, since $\phi_O$ and $\phi_E$ have signs different from each other, the viewfinder optical system is composed in such a manner that both the objective lens component 12 and the eyepiece lens component 14 have strong powers at the wide position, and vice versa at the tele position. In other words, the viewfinder optical system is composed in such a manner that the positive power of the calcite lens element arranged in the objective lens component 12 and the negative power of the calcite lens element arranged in the eyepiece lens component 14 are weakened at the wide position, and vice versa at the tele position, whereby the calcite lens elements arranged in the objective lens component 12 and the eyepiece lens component 14 have the lower refractive powers at the wide position, and vice versa at the tele position.

Now, description will be made on variation of magnification of the Embodiment 2.

First, the ray coming from an object is transmitted through the polarizing plate 11, the TN liquid crystal layer 17, the objective lens component 12 and the eyepiece lens component 14 in this order, and then falls on the eye 15.

At the wide position, no voltage is applied to the TN liquid crystal layer 17 from the voltage application means 18, the ray having passed through the polarizing plate 11 is polarized in such a direction that the ray having passed through the TN liquid crystal layer 17 is polarized in the direction perpendicular to the direction of polarization at the incidence stage, and the extraordinary ray for both the calcite lens elements arranged in the objective lens component 12 and the eyepiece lens component 14. Therefore, the refractive power of the objective lens component 12, that of the eyepiece lens component 14 and the angular magnification of the viewfinder optical system at the wide position are calculated as follows:

$$\phi_{OW}=(n_C-1)(1/r_3-1/r_6)+(n_O-1)(1/r_4-1/r_5)$$

$$\phi_{EW}=(n_C-1)(1/r_7-1/r_{10})+(n_O-1)(1/r_8-1/r_9)$$

$$\gamma_W=-\phi_{EW}/\phi_{OW}$$

The above formulae give the refractive powers of the lens components and the angular magnification of the viewfinder optical system as $\phi_{OW}=-0.03967$, $\phi_{EW}=0.02050$ and $\gamma_W=0.5168$ respectively. On the other hands, accurate calculations taking thickness of the lens components into consideration will give refractive powers of $\phi_{OW}=-0.04045$ and $\phi_{EW}=0.02019$ as well as an angular magnification of $\gamma_W=0.52385$ at a dioptric power of $-1$ diopter.

At the tele position, a voltage is applied to the TN liquid crystal layer 17 from the voltage application means 18, and the polarized direction of the ray having passed through the polarizing plate 11 remains unchanged even after transmission through the TN liquid crystal layer 17 so that the ray becomes the ordinary ray for both the calcite lens elements arranged in the objective lens component 12 and the eyepiece lens component 14. Therefore, the refractive power of the objective lens component 12, that of the eyepiece lens component 14 and the angular magnification of the finder optical system at the tele position are calculated as follows:

$$\phi_{OT}=(n_C-1)(1/r_3-1/r_6)+(n_O-1)(1/r_4-1/r_5)$$

$$\phi_{ET}=(n_C-1)(1/r_7-1/r_{10})+(n_O-1)(1/r_8-1/r_9)$$

$$\gamma_T=-\phi_{ET}/\phi_{OT}$$

The above calculations give the refractive powers and the angular magnification as $\phi_{OT}=-0.01271$, $\phi_{ET}=0.00889$ and $\gamma_T=0.6995$. On the other hand, accurate calculations taking thickness of the lens components into consideration will give refractive powers of $\phi_{OT}=31\ 0.01270$ and $\phi_{ET}=0.08892$ as well as an angular magnification of $\gamma_T=0.77873$ at a dioptric power of $-1$ diopter.

Though the crystalline materials such as calcite used in the Embodiment 2 are expensive, these materials are more excellent in performance such as stabilities of refractive indices and double refraction as well as clarities than the liquid crystal lenses, and therefore assure higher legibility of image in viewfinders. Further, though each of the lens components is designed as a cemented doublet in the Embodiment 2, it is possible to divide the lens elements thereof as required for correction of aberrations and compose the lens component of a large number of lens elements.

Numerical data of the Embodiment 2 are listed in the following table:

| Surface No. | Radius of curvature | Distance between surfaces (d) | Refractive index or material (n) |
|---|---|---|---|
| 1 | ∞ | 1 | Polarizing plate and TN liquid crystal layer |
| 2 | ∞ | 1 | Air |
| 3 | −29.5273 | 0.5 | 1.51633 |
| 4 | 12.7584 | 2 | Calcite [$n_e$ = 1.48640] [$n_o$ = 1.65835] |
| 5 | −12.7584 | 0.5 | 1.51633 |
| 6 | 22.5273 | 20 | Air |
| 7 | 54.8589 | 2 | 1.51633 |
| 8 | −29.6233 | 0.5 | Calcite [$n_e$ = 1.48640] [$n_o$ = 1.65835] |
| 9 | 29.6233 | 2 | 1.51633 |
| 10 | −56.9470 | 15 | Air |
| 11 | ∞ (Pupil location) | | |

Angular magnification $\gamma_T = 0.77873$ $\gamma_W = 0.52385$
Dioptric power: −1 diopter In the Embodiments 1 and 2, the polarizing element 11 may be arranged between the objective lens component 12 and the eyepiece lens component 14 or after the eyepiece lens component 14, as shown by chain lines in FIGS. 3 and 4.

What is claimed is:

1. A variable magnification viewfinder optical system comprising:
   a polarizing element for allowing incident light to emerge as a linearly polarized light,
   an objective optical system comprising a first lens component having refractive power that varies depending on an oscillating direction of the incident light,
   an eyepiece optical system comprising a second lens component having refractive power that varies depending on the oscillating direction of the incident light, and
   means for changing the oscillating direction of said polarizing element from a first plane to a second plane perpendicular to the first plane.

2. A variable magnification viewfinder optical system according to claim 1, wherein each of said first and second lens components comprises a liquid crystal lens element.

3. A variable magnification viewfinder optical system according to claim 1, wherein each of said first and second lens components comprises a calcite lens element.

4. A variable magnification viewfinder optical system according to claim 1, wherein said first lens component and said second lens component are disposed in such a manner that said objective optical system has a first power and said eyepiece optical system has a second power at a wide position of said viewfinder optical system, said first power being greater than a power of said objective optical system at a tele position of said viewfinder and said second power being weaker than a power of said eyepiece optical system at the table position.

5. A variable magnification viewfinder optical system according to claim 1, wherein said first lens component and said second lens component are disposed in such a manner that both said objective optical system and said eyepiece optical system have greater powers at a wide position of said viewfinder optical system than at a tele position of said viewfinder optical system.

6. A variable magnification viewfinder optical system according to claim 1, wherein said polarizing element is arranged before said objective optical system.

7. A variable magnification viewfinder optical system according to claim 1, wherein said polarizing element is arranged between said objective optical system and said eyepiece optical system.

8. A variable magnification viewfinder optical system according to claim 1, wherein said polarizing element is arranged after said eyepiece optical system.

9. A variable magnification viewfinder optical system according to claim 1, wherein said changing means changes the magnification of the viewfinder optical system when the plane of polarization is changed.

* * * * *

UNITED STATES PATENT AND TRADEMARK OFFICE
CERTIFICATE OF CORRECTION

PATENT NO. : 5,052,791

DATED : October 1, 1991

INVENTOR(S) : Juro KIKUCHI

It is certified that error appears in the above-identified patent and that said Letters Patent is hereby corrected as shown below:

Column 1, line 48, change "adapted a" to --adapted as--.

Column 4, line 53, change "$\phi_z$" to --$\phi_E$--.

Column 6, line 8, change "n." to --$n_e$--; and
line 9, change "n." to --$n_o$--.

Column 7, line 27, change "$(1/r_3 - 1/r_6) + (n_c - 1)$" to --$(1/r_3 - 1/r_6) + (n_e - 1)$--.

Column 8, line 50, change "$n_o$" to --$r_{10}$--; and
line 54, change "is $n_o$" to --is $n_e$--.

Column 9, line 51, change "$(1/r_3 - 1/r_6) + (n_o - 1)$" to --$(1/r_3 - 1/r_6) + (n_e - 1)$--;
line 53, change "$(1/r_7 - 1/r_{10}) + (n_o - 1)$" to --$(1/r_7 - 1/r_{10}) + (n_e - 1)$--; and line 59, change "$\phi_{ow}$ -0.03967" to --$\phi_{ow}$=-0.03967--.

Column 10, line 16, change "$\phi_{TO}$" to --$\phi_{OT}$--; and
line 23, change "$\phi_{OT}$=310.01270" to --$\phi_{OT}$=-0.01270--.

Signed and Sealed this

Sixteenth Day of November, 1993

BRUCE LEHMAN

Attest:

*Attesting Officer*

*Commissioner of Patents and Trademarks*